Feb. 23, 1965  A. McAULEY  3,170,673
STRINGING BLOCK
Filed Feb. 3, 1961
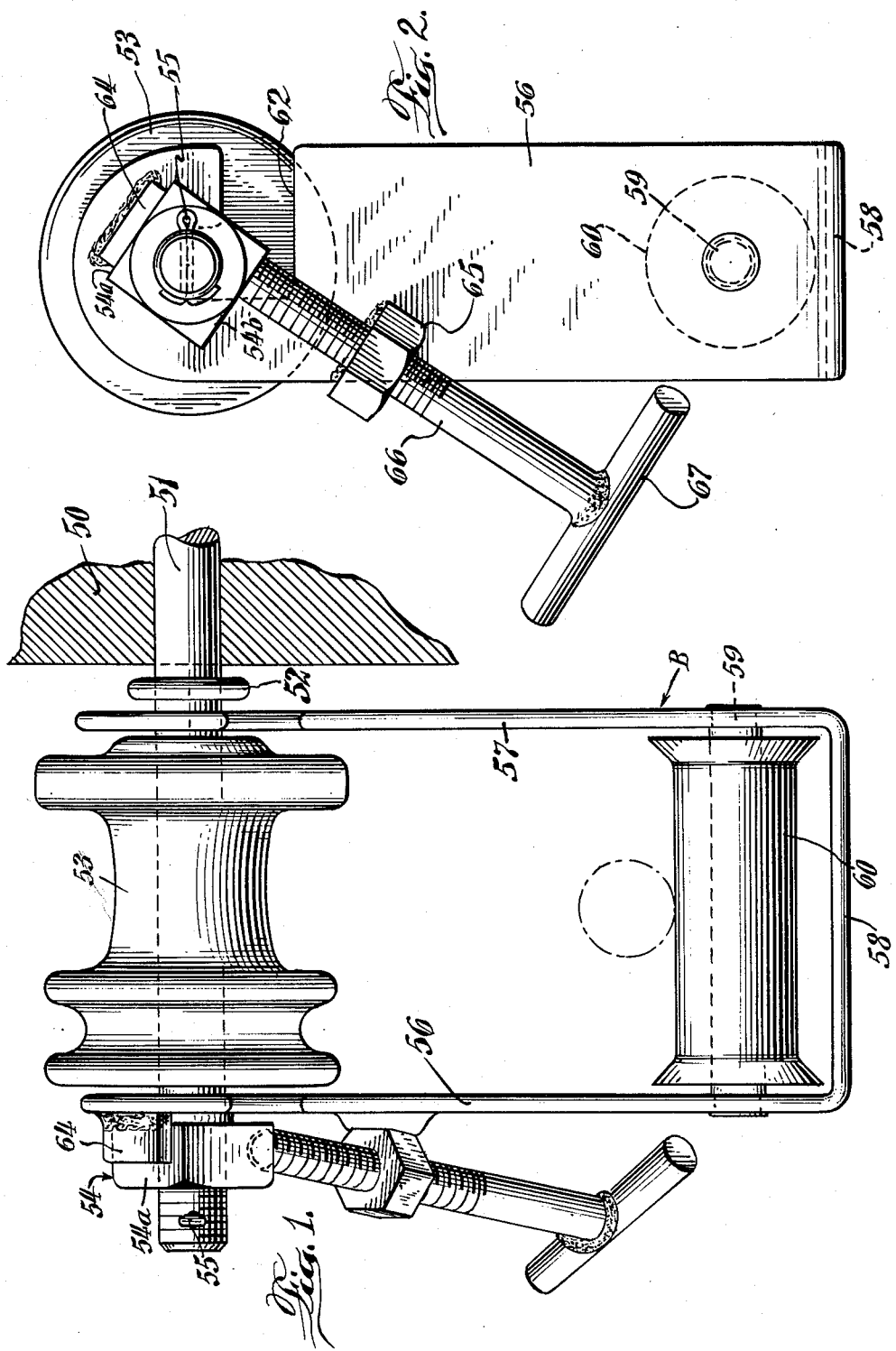

United States Patent Office 3,170,673
Patented Feb. 23, 1965

3,170,673
STRINGING BLOCK
Anthony McAuley, Maywood, Ill., assignor to A. B. Chance Company, Centralia, Mo., a corporation of Missouri
Filed Feb. 3, 1961, Ser. No. 87,028
3 Claims. (Cl. 254—134.3)

This invention relates to a stringing block and more particularly to a stringing block for stringing flexible conductor or cable members between poles, as in a power distribution system, where the poles are provided with neutral spools mounted on the sides thereof.

In many electrical distribution systems, three or four conductors are strung between poles which have one or more cross arms affixed thereto to which the cables are secured. A modern trend in such system construction is to eliminate the cross arms and secure the conductors to a neutral spool which is mounted on a bolt extending from the side of the pole, normal to its length. At the present time, improvised methods using a snatch block or sheave arrangement are used to string the wires between the poles. The block is usually attached to a side of the pole with a sling rope and has a tendency to swing around the pole when a knotted rope or conductor wire is passed through the throat of the block. These present methods are undesirable because of tangling and damage to the conductors. This is especially true in the case of aluminum conductors, which are easily damaged and which are being used increasingly more in electrical distribution systems.

A principal object of this invention is to provide a new and improved stringing block for stringing conductors or cables between poles having neutral spools mounted thereon which facilitates the conductor stringing operation and eliminates damage to the conductors.

A feature of this invention is the provision of stringing blocks which may be attached directly to a neutral spool bolt, eliminating the necessity of attaching the blocks to the pole.

Another feature is to provide a stringing block that hangs from a neutral spool bolt and has a cable guide defined by a frame, a roller and the neutral spool.

Yet another feature is to provide a stringing block having an adjustable locking device for securing the block to a neutral spool bolt.

Further features and advantages of the invention will readily be apparent from the following specification and from the drawings in which:

FIGURE 1 is an elevational view of a neutral spool stringing block embodying the invention; and FIGURE 2 is a side elevational view of the stringing block.

In FIGURE 1 a pole 50 is provided with a neutral spool bolt 51 mounted on the side thereof and extending at right angles to the length of the pole. A spacing washer 52 rigidly mounted on bolt 51 maintains a predetermined length of bolt extending outward from the pole. An insulator or spool 53 is provided on the spool bolt 51 and an insulator nut 54 is threaded onto the end of the bolt to secure the insulator thereon. A cotter pin 55 prevents the nut from working off the end of the bolt.

The neutral spool stringing block is indicated generally at B in FIGURE 1 and comprises a U-shaped frame having legs 56 and 57 and a bottom portion or bight 58. A pin 59 is secured between legs 56 and 57 adjacent and parallel to the bottom 58. The pin 59 supports a concave roller 60 which is free to roll thereon and extends substantially the entire distance between the two legs. The roller 60 provides a support for carrying a cable 61 that is to be strung between similar poles having neutral spools thereon. The legs 56 and 57 are each provided with hooked slots 62 in the upper portions thereof for engagement with spool bolt 51 so that the stringing block may hang therefrom. The slot 62 may be of any desired shape to achieve this purpose and the preferred embodiment shows a right-angled slot, having a semi-circular top portion that engages the spool bolt 51 as shown in FIGURE 2. A jam bracket or lug 64 is secured at an angle to the outer surface of leg 56 above the slot 62 and extends outwardly therefrom. A threaded nut 65 is also secured to the outer surface of the leg 56 below the slot 62 and at the same angle as the bracket 64. A threaded bolt 66 having a handle portion 67 is screwed through nut 65 from the bottom and extends upwardly therethrough. The angle referred to above must be such that the handle 67 will clear frame leg 56 as the bolt 66 is screwed into the nut 65 as shown in FIGURE 2.

To use the neutral spool stringing block, the block B is hung from the spool bolt 51 by engaging the slotted hook portions 62 over the bolt so that the legs 56 and 57 straddle the insulator 53, the leg 57 positioned between the insulator 53 and the pole 50 and the leg 56 positioned between the insulator and the insulator nut 54. The insulator nut is turned so that one side or tool-engaging flat 54a is at the same angle as the bracket 64 and the stringing block positioned so that the lower surface of the bracket rests agianst the side 54a. The bolt 66 is then threaded upwardly through the nut 65 until the end of the bolt abuts the side 54b of the insulator bolt 54 which is opposite and parallel to the side 54a. It can readily be seen that as the bolt 66 is tightened against the side 54b, the insulator nut is jammed against the bracket 64 and will firmly hold stringing block B in place on the spool bolt 51. A guide closure for the cable 61 is defined by the roller 60, the spool bolt 51 and insulator 53, and the legs 56 and 57.

The cable 61 which is supported by roller 60 is then pulled through the guide closure by means of a line that was inserted through the guide when it was installed. The wire is tensioned and the stringing block removed by loosening the bolt 66 and disengaging the frame legs 56 and 57 from the spool bolt. The cable is then secured to the insulator 53 to complete the installation. In new electrical distribution systems, the neutral spool stringing blocks may be installed and the conductors strung while the poles are on the ground.

While I have shown and described certain embodiments of my invention, it is to be understood that it is capable of many modifications, changes therefore in the construction and arrangement may be made without departing from the spirit and scope of the invention as disclosed in the appended claims.

I claim:

1. A device for stringing a cable on poles having a bolt, provided with an insulator secured thereon with an insulator nut, extending from the side of the pole, comprising: a U-shaped frame carrying a roller between the legs thereof and remote from the ends of the legs, said legs being formed into a hook configuration for engagement with the bolt to hang said device from the bolt; a locking means including an adjustable means mounted on one leg of said U-frame for abutting one side of said insulator nut and a bracket mounted on said one leg to abut the opposite side of said insulator nut to secure said stringing device to the nut and bolt.

2. The stringing device of claim 1 whereby said adjustable means comprises a threaded nut mounted to the outside surface of one leg of the U-frame and a threaded bolt screwed through the nut to abut the insulator nut.

3. Apparatus for stringing cable on a pole having a bolt with a spool thereon extending from the pole, there being a nut on the bolt for maintaining the spool thereon, the nut having a plurality of tool-engaging flats, said apparatus comprising: a U-shaped frame having a pair of legs and a bight; a roller carried by the legs, the ends of the legs remote from the bight being adapted to engage the bolt, with the legs straddling the spool and one of said legs disposed between the spool and the nut, to attach the frame to said bolt, said one leg being provided with a lug for engaging one of the flats of the nut; and locking means mounted on said one leg for releasably engaging one of the other flats of said nut to rigidly secure said apparatus to the nut and bolt.

References Cited in the file of this patent

UNITED STATES PATENTS

| | | |
|---|---|---|
| 224,027 | Metzler | Feb. 3, 1880 |
| 511,132 | Fisher | Dec. 19, 1893 |
| 1,281,942 | Gold | Oct. 15, 1918 |
| 2,181,072 | Sayers | Nov. 21, 1939 |
| 2,188,715 | Ingram | Jan. 30, 1940 |